W. G. FRANKLIN.
CUFF BUTTON.
APPLICATION FILED JUNE 7, 1920.
1,359,684.
Patented Nov. 23, 1920.
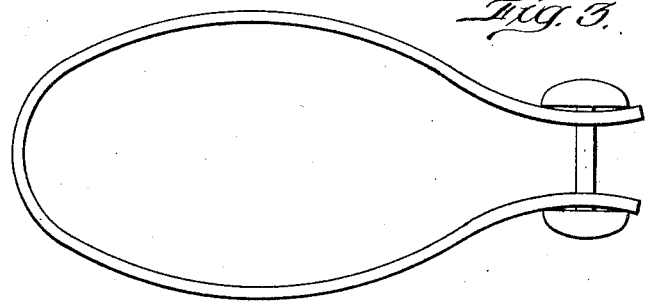
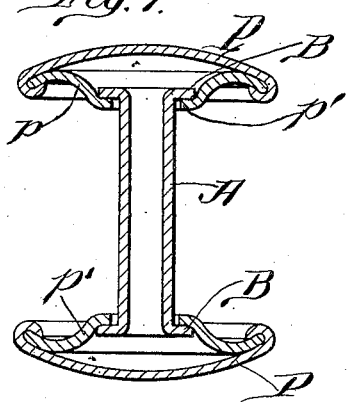 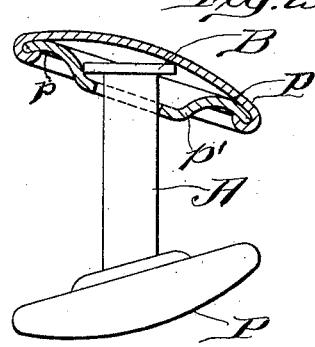
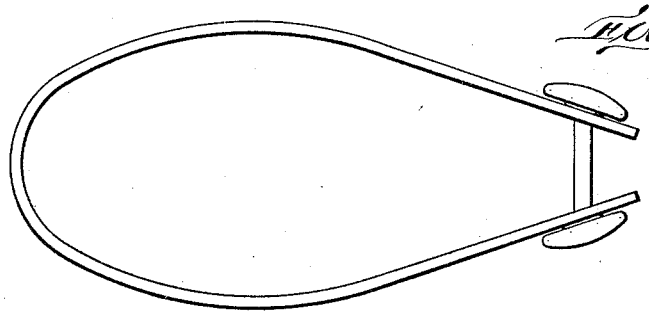
Inventor:
Wallace G. Franklin,
By Mitchell, Chadwick & Kent,
Attys.

UNITED STATES PATENT OFFICE.

WALLACE G. FRANKLIN, OF NORTH ATTLEBORO, MASSACHUSETTS, ASSIGNOR TO E. I. FRANKLIN & CO., OF NORTH ATTLEBORO, MASSACHUSETTS, A COPARTNERSHIP CONSISTING OF WALLACE G. FRANKLIN, CLARENCE W. FISHER, AND ELTON B. FISHER.

CUFF-BUTTON.

1,359,684.      Specification of Letters Patent.      Patented Nov. 23, 1920.

Application filed June 7, 1920. Serial No. 386,945.

*To all whom it may concern:*

Be it known that I, WALLACE G. FRANKLIN, a citizen of the United States, residing at North Attleboro, in the county of Bristol and State of Massachusetts, have invented certain new and useful Improvements in Cuff-Buttons, of which the following is a specification.

My invention is a semi-stiff cuff button of the so-called "spool" type, made up of a stiff stem or shank upon either end of which are mounted hollow heads, each of which is capable of a limited universal tilting movement with relation to the stem.

Figure 1 is a longitudinal sectional elevation of a spool cuff button, embodying my invention;

Fig. 2 is an elevation, partly in section of a spool cuff button, as in Fig. 1, but showing the heads in extreme tilted position;

Fig. 3 shows the old style spool cuff button, applied to a cuff;

Fig. 4 shows my improved spool cuff button applied to a cuff.

Cuff buttons made up of a stiff stem or shank upon either end of which are fixed heads and also in which the heads were detachably connected to the stem by a ball and socket joint, are old and well known. It is the object of my invention to combine in one cuff fastener the advantage of cheapness and simplicity of construction and of flexibility inherent in both constructions.

To this end I employ a stem or shank A of stiff construction, the opposite ends of which carry a flange B. The heads are made up of a face plate P, and an inner plate, *p*, which are spaced apart and their relations fixed, so far as this space is concerned. The plate *p*, is centrally perforated, the aperture being somewhat larger than the diameter of the shank, and, in the assembly, this perforated plate is placed upon the shank and the flange B is then formed or secured upon the end of the shank and the plate, *p*, is then secured to the plate P in the proper spaced relation. It will be obvious that this loose connection will permit the head to tilt in any direction, the extreme extent of motion being determined by the diameter of the flange and the space between the plates P and *p*, since the tilting will result in one side of the flange B engaging the inner surface of plate P and the other side the inner surface of plate *p* and the stopping of the tilting action (see Figs. 1 and 2.)

In the figures is shown a hollow shank on which the flange is formed by expanding the end of the tube to produce the flange B and in which the plate *p* is formed with a central conical truncated projection *p'*, through which the shank passes.

The depth of this projection is the determinative factor in providing the proper space to receive the flange B, so that the desired capacity for tilting movement may be had. It will be seen that the mechanical construction employed is of extreme simplicity and strength and therefore relatively cheap to make and to assemble, only three different parts being employed, namely inner and outer head plates and the flanged tubular stem or shank.

I claim:

In a cuff button, the combination of a shank expanded at both ends to form flanges; a hollow head made up of an outer face plate and an inner plate having a truncated recess formed centrally, to embrace and receive within the hollow head the flanged end of the shank and loosely connect the heads and the shank, the plates of the heads being suitably spaced to permit the heads to assume a predetermined maximum angle of inclination with respect to the shank.

Signed at North Attleboro, Massachusetts, this 28th day of May, 1920.

WALLACE G. FRANKLIN.

Witnesses:
M. T. CAROLAN,
H. M. DUMICAN.